(No Model.)

H. CLAY.
TRANSMITTER FOR TELEPHONES.

No. 280,580. Patented July 3, 1883.

WITNESSES:
A. P. Grant
W. F. Kirches

INVENTOR:
Henry Clay,
BY John A. Wiedersheim
ATTORNEY.

N. PETERS, Photo-Lithographer, Washington, D. C.

UNITED STATES PATENT OFFICE.

HENRY CLAY, OF PHILADELPHIA, PENNSYLVANIA.

TRANSMITTER FOR TELEPHONES.

SPECIFICATION forming part of Letters Patent No. 280,580, dated July 3, 1883.

Application filed September 21, 1882. (No model.)

*To all whom it may concern:*

Be it known that I, HENRY CLAY, a citizen of the United States, residing in the city and county of Philadelphia, State of Pennsylvania, have invented a new and useful Improvement in Transmitters for Telephones, which improvement is fully set forth in the following specification and accompanying drawings, in which—

Figure 1:
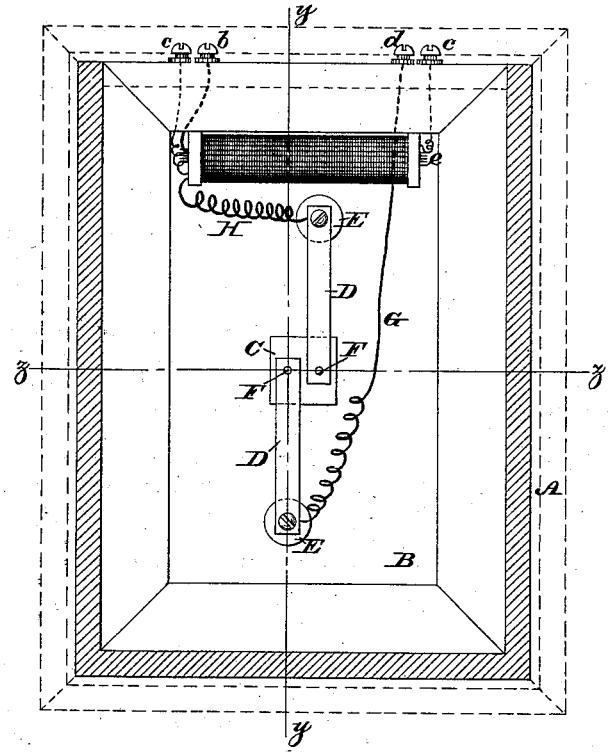
Figure 2:
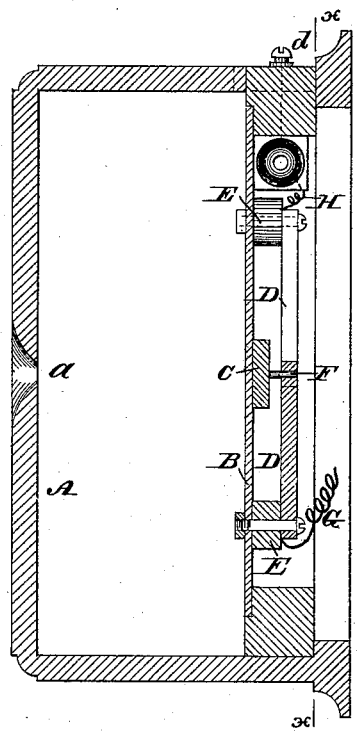
Figure 3:
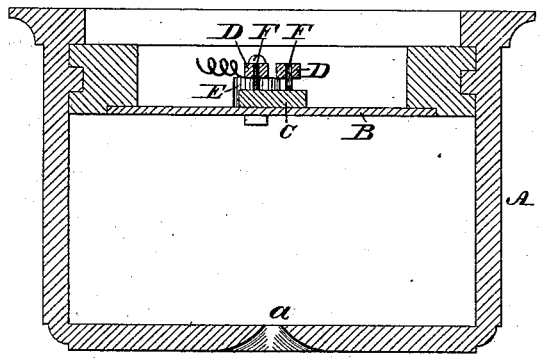

Figure 1 is a view of the interior of the telephonic transmitter embodying my invention. Fig. 2 is a section thereof in line $y$ $y$, Fig. 1. Fig. 3 is a section thereof in line $z$ $z$, Fig. 1.

Similar letters of reference indicate corresponding parts in the several figures.

My invention consists of certain improvements in telephonic transmitters, the construction, operation, and advantages whereof will be hereinafter fully set forth.

Referring to the drawings, A represents the box of the transmitter, having the usual opening, $a$, and B represents the sounding-board, which is secured within said box, and has firmly attached to its center a carbon block, C. D represents bars, strips, or plates of metal, the outer ends of which are fixed to pieces E, of metal or other suitable material, said pieces being firmly attached to the sounding-board or diaphragm B. The inner ends of the plates D have secured to them platinum points or electrodes F, which are in contact with the carbon block C, as more clearly shown in Fig. 2. A wire, G, is connected with one of the plates D and the post $d$. A wire, H, is connected with the other plate D, and, passing through the primary circuit of an induction-coil, J, of usual construction, is connected with the post $b$, said coil being properly secured to the box A. Posts $b$ $d$ are connected with a battery or other source of electricity, as usual. The fine wire of the coil envelops the coils of the wire H, and has its ends connected with the posts $c$ $c$, which are connected with the line and ground, respectively, as usual, the core of the coil being a bundle of wires, $e$, as shown in Fig. 1.

It will also be seen that the block C forms a bridge to the two electrodes, the whole being arranged in series in an electric circuit, whereby the current passes undivided from one electrode to the other by the carbon block or bridge, thus giving two distinct and independent points of electrical variation by receiving vibratory effects from four distinct points of the sounding-board or diaphragm, and causing the enunciation to be more perfect.

I am aware that it is not new to form a transmitter with two electrodes which impinge upon the diaphragm, and so included in the circuit as to cause the current to pass in multiple arc through the instrument. I am also aware that it is not new to support the two electrodes on the diaphragm, and therefore disclaim such features.

Having thus described my invention, what I claim as new, and desire to secure by Letters Patent, is—

1. In a transmitter for telephones, a sounding-board or diaphragm, in combination with a carbon block attached to said diaphragm, and two supported electrodes, said carbon block forming a bridge to the two electrodes, the whole being arranged in series in an electric circuit, whereby the current passes undivided from one electrode to the other, substantially as described.

2. In a transmitter for telephones, a sounding-board or diaphragm, in combination with a carbon block centrally attached thereto, and two supported electrodes, also attached to said diaphragm, the whole being arranged in series in an electric circuit, whereby the current passes undivided from one electrode to the other, substantially as and for the purpose set forth.

HENRY CLAY.

Witnesses:
JOHN A. WIEDERSHEIM,
A. P. GRANT.